(12) United States Patent
Yuan et al.

(10) Patent No.: US 12,248,169 B2
(45) Date of Patent: Mar. 11, 2025

(54) BACKLIGHT MODULE AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Qiong Yuan, Beijing (CN); Wencheng Luo, Beijing (CN); Zhi Li, Beijing (CN); Hening Zhang, Beijing (CN); Bowen Xiong, Beijing (CN); Ke Liao, Beijing (CN); Jinhong Zhang, Beijing (CN); Wei Ran, Beijing (CN); Yu Wang, Beijing (CN); Wenqi Quan, Beijing (CN); Xin Cen, Beijing (CN); Yao Chen, Beijing (CN); Shengjie Yin, Beijing (CN); Yansheng Sun, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/029,490

(22) PCT Filed: May 23, 2022

(86) PCT No.: PCT/CN2022/094406
§ 371 (c)(1),
(2) Date: Mar. 30, 2023

(87) PCT Pub. No.: WO2023/225779
PCT Pub. Date: Nov. 30, 2023

(65) Prior Publication Data
US 2024/0361514 A1    Oct. 31, 2024

(51) Int. Cl.
*F21V 8/00* (2006.01)

(52) U.S. Cl.
CPC ......... *G02B 6/0088* (2013.01); *G02B 6/0055* (2013.01); *G02B 6/0073* (2013.01)

(58) Field of Classification Search
CPC ... G02B 6/0088; G02B 6/0055; G02B 6/0073
See application file for complete search history.

(56) References Cited

U.S. PATENT DOCUMENTS 11,829,028 B2 * 11/2023 Zhang ............... G02F 1/133612
2011/0019121 A1    1/2011 Mo et al.
(Continued)

FOREIGN PATENT DOCUMENTS

| CN | 101630076 A | 1/2010 |
| CN | 101666463 A | 3/2010 |

(Continued)

*Primary Examiner* — Christopher E Dunay
(74) *Attorney, Agent, or Firm* — WHDA, LLP

(57) ABSTRACT

Backlight module and display device are provided. Backlight module is for providing light source for display panel. Display panel has bonding side at a side of display panel in first direction. Backlight module includes: back plate, including base plate at backlight side of display panel, and first side plate at bonding side, where a side of first side plate away from base plate is bent towards direction away from center of base plate to form top plate supporting display panel; rubber frame, including second side plate at bonding side, where first opening is in middle of second side plate in extension direction of second side plate to accommodate first side plate; main circuit board, including opposite first and second ends in first direction, where first end is inserted between top plate and first side plate, and second end has (Continued)

first bonding area for bonding connection with display panel.

20 Claims, 6 Drawing Sheets

(56) References Cited

U.S. PATENT DOCUMENTS

| | | | |
|---|---|---|---|
| 2015/0085221 A1 | 3/2015 | Zhang et al. | |
| 2015/0268410 A1* | 9/2015 | Yu | G02B 6/0068 |
| | | | 349/58 |
| 2018/0306968 A1* | 10/2018 | Matsubara | G02B 6/0088 |
| 2021/0333468 A1 | 10/2021 | Li et al. | |
| 2022/0357613 A1* | 11/2022 | Qi | H05K 1/189 |
| 2024/0147787 A1* | 5/2024 | Li | H01L 27/0248 |
| 2024/0295685 A1* | 9/2024 | Zhou | G02B 6/0053 |
| 2024/0302688 A1* | 9/2024 | Xu | G02F 1/133602 |

FOREIGN PATENT DOCUMENTS

| | | |
|---|---|---|
| CN | 102053404 A | 5/2011 |
| CN | 202182991 U | 4/2012 |
| CN | 203241655 U | 10/2013 |
| CN | 103836460 A | 6/2014 |
| CN | 203686916 U | 7/2014 |
| CN | 102691934 B | 9/2014 |
| CN | 203982037 U | 12/2014 |
| CN | 105093612 A | 11/2015 |
| CN | 109541847 A | 3/2019 |

* cited by examiner

BACKLIGHT MODULE AND DISPLAY DEVICE

CROSS-REFERENCE TO RELATED APPLICATION

This application is the U.S. national phase of PCT Application No. PCT/CN2022/094406 filed on May 23, 2022, which is incorporated in its entirety by reference herein.

TECHNICAL FIELD

The present disclosure relates to the technical field of manufacturing display products, and more particularly to a backlight module and a display device.

BACKGROUND

Shapes and dimensions of a mini Light-Emitting Diode (LED) module required by client systems are consistent with that of a conventional edge-type LED module, so that the system mould can be shared, and the smooth switching from the conventional edge-type module to the mini LED module is achieved. The mini LED has a large number of lights and complicated driving line arrangement, sizes and numbers of the PowerIC and LED Diver and surrounding components increase, and the number of the CNT PIN (Connector PIN) increases. With the increased sizes and numbers, there is insufficient space in Flat mini LED for PCBa (Printed Circuit Board Assembly) arrangement, which results in concentration of components, easy signal crosstalk, heat accumulation, no copper exposed area for heat conduction, breakages at a lot of positions of back plate, easy deformation of the module caused by weak intensity, and inconvenience in inserting and pulling caused by too short FPC (Flexible Printed Circuit board) of light board, etc.

SUMMARY

In order to address the above-mentioned technical issues, the present disclosure provides a backlight module and a display device, which addresses the problem of insufficient arrangement space for a main circuit board.

In order to achieve the above object, embodiments of the present disclosure provide the following technical solutions. A backlight module for providing a light source for a display panel is provided, where the display panel has a bonding side at a side of the display panel in a first direction, and the backlight module includes:
  a back plate, where the back plate includes a base plate at a backlight side of the display panel, and a first side plate at the bonding side, where a side of the first side plate away from the base plate is bent towards a direction away from a center of the base plate to form a top plate, and the top plate is configured to support the display panel;
  a rubber frame, including a second side plate at the bonding side, where a first opening is provided in a middle of the second side plate in an extension direction of the second side plate so as to accommodate the first side plate; and
  a main circuit board, where the main circuit board includes a first end and a second end in the first direction that are opposite to each other, the first end is inserted between the top plate and the first side plate, and the second end has a first bonding area for bonding connection with the display panel.

Optionally, a heat-conducting adhesive is provided between the top plate and the main circuit board.

Optionally, a first surface of the main circuit board near the top plate has a wiring area and a non-wiring area, and the non-wiring area is a copper exposed area and is connected to the top plate through the heat-conducting adhesive.

Optionally, the back plate is made of a conductive metal, part of the top plate projects outwardly to form a lug, and a conductive adhesive is provided between the lug and the main circuit board.

Optionally, the back plate is made of a conductive metal, and a region between the top plate and the main circuit board includes a first region and a second region in a direction parallel to the top plate, where the first region is provided with a heat-conducting adhesive, and the second region is provided with a conductive adhesive.

Optionally, the backlight module further includes a light bar, where the light bar includes a light board and a first flexible printed circuit board connected to the light board, and the first flexible printed circuit board passes through a through hole in the first side plate and extends to a side of the first side plate away from the base plate.

Optionally, the first side plate has a plate-like structure perpendicular to the base plate.

Optionally, the first side plate is provided with a reflective tape on its inner side surface near the base plate.

Optionally, the reflective tape includes a base made of PC, PET or PU material, and a double-sided tape or a single-sided tape attached to opposite sides of the base.

Optionally, the backlight module further includes a light bar, where the light bar includes a light board and a first flexible printed circuit board connected to the light board, the light board includes an LED light setting area and a first region at a side of the LED light setting area in the first direction, the first region has a second bonding area for bonding connection with the first flexible printed circuit board, and the reflective tape is between the first region and a non-display area of the display panel.

Optionally, a position, corresponding to the second bonding area, on a connection surface where the reflective tape is connected to the first region is recessed to form a groove.

Optionally, the first side plate includes a first portion, a second portion, and a third portion:
  the first portion is connected to the base plate and perpendicular to the base plate;
  the second portion is formed by bending the first portion in a direction of approaching a center of the base plate, and the second portion is parallel to the base plate;
  the third portion is formed by bending the second portion in a direction away from the base plate, and the third portion is perpendicular to the second portion; and
  the first end of the main circuit board is inserted into a space formed by the top plate, the second portion and the third portion together.

Optionally, a reflective layer is provide on respective side surfaces, near the base plate, of the first portion, the second portion and the third portion.

Optionally, the backlight module further includes a light bar, where the light bar includes a light board and a first flexible printed circuit board connected to the light board, the light board includes a LED light setting area and a first region at a side of the LED light setting area in the first direction, the first region has a second bonding area for bonding connection with the first flexible printed circuit board, and the first portion is connected to the first region.

Optionally, a position, corresponding to the second bonding area, on a connection surface where the first portion is connected to the first region is recessed to form a groove.

Optionally, second openings are provided in two ends of the first side plate in an extension direction of the first side plate;

the second side plate includes two connection parts at two ends of the first opening, and the two connection parts respectively cooperate with the corresponding second openings.

Optionally, the backlight module further includes a light guide structure, where a groove is provided on a surface of the connection part away from the base plate to cooperate with a lug on the light guide structure.

Optionally, one of the connection parts includes an extension part extending towards the other of the connection parts, and the extension part is connected to a surface of the first side plate away from the base plate through an adhesive layer.

Optionally, a gap between the main circuit board and the first side plate ranges from 0 to 0.15 mm.

A display device is also provided according to embodiments of the present disclosure, including: a display panel and the backlight module described above, where the display panel includes a first edge at the bonding side, the top plate includes a second edge away from the base plate, the first edge is at a side of the second edge near the base plate, and a distance between the edge of the display panel at the bonding side and the edge of the top plate away from the display panel is greater than 0.15 mm.

Optionally, a heat-conducting adhesive is provided between the top plate and the main circuit board, and a fixing adhesive is provided between the display panel and the top plate;

the display panel includes a first polarizer, a first substrate, a second substrate and a second polarizer that are sequentially stacked in a direction away from the backlight module: a height of each component on the main circuit board is less than or equal to a first height, and the first height is a sum of a thickness of the heat-conducting adhesive, a thickness of the top plate, a thickness of the fixing adhesive, a thickness of the first substrate, and a thickness of the second substrate.

Advantageous effects of the present disclosure are as follows. By removing a part of the rubber frame at the bonding side, the back plate retracts towards the AA area, and based on the structure arrangements of the first side plate and the top plate, the display panel is supported, moreover, the main circuit board can extend into the space formed by the first side plate and the top plate, increasing the space for arranging the main circuit board.

Figure 1:
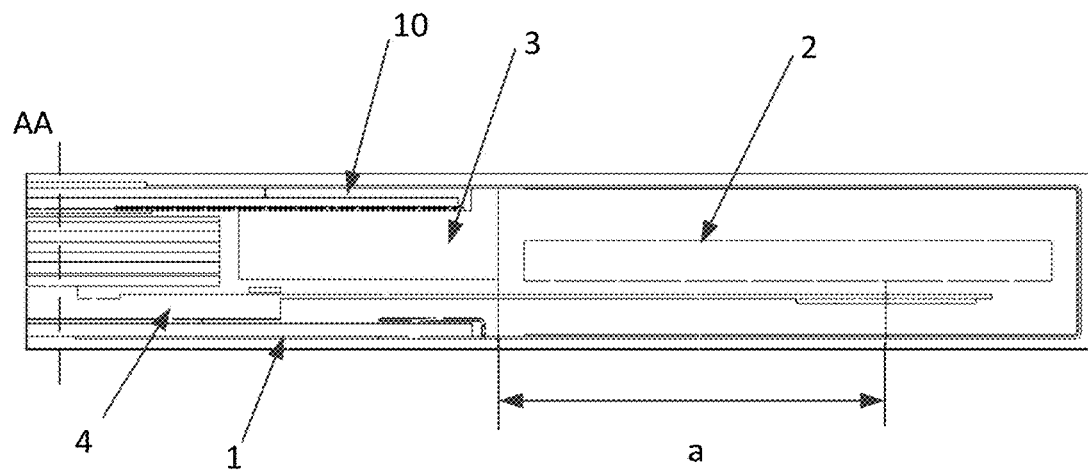
FIG. 1 is a structural diagram of a display device in the related technologies.

In the drawings: 1, back plate; 11, base plate; 12, first side plate; 13, top plate; 121, through hole; 122, first portion; 123, second portion; 124, third portion; 1241, first lug; 125, second opening; 2, main circuit board; 3, rubber frame; 31, connection part; 32, extension part; 311, first groove; 4, light bar; 41, first flexible printed circuit board; 42, LED light setting area; 43, first region; 5, reflective tape; 51, adhesive layer; 6, fixing adhesive; 7, light guide structure; 8, heat-conducting adhesive; 10, display panel; 20, second flexible printed circuit board.

DETAILED DESCRIPTION

To make objectives, technical solutions, and advantages of embodiments of the present disclosure clearer, the technical solutions of the embodiments of the present disclosure will be clearly and completely described hereinafter with reference to the accompanying drawings of the embodiments of the present disclosure. Apparently, the described embodiments are a part rather than all of the embodiments of the present disclosure. Based on the described embodiments of the present disclosure, all other embodiments obtained by those skilled in the art fall within the protection scope of the present disclosure.

In descriptions of the present disclosure, it should be noted that the terms "central", "upper", "lower", "left", "right", "vertical", "horizontal", "inner", "outer", and the like indicate orientations or positional relationships based on orientations or positional relationships shown in the drawings, merely to facilitate description of the present disclosure and simplify the description, and do not indicate or imply that the referenced devices or elements must have a particular orientation, be constructed and operated in a particular orientation, and thus should not be construed as limiting the present disclosure. Furthermore, the terms "first", "second", and "third" are used for descriptive purposes only and are not to be construed as indicating or implying relative importance.

For shapes and dimensions required by client side, there is insufficient arrangement space for PCBa in Flat mini LED, which has the following problems:
1. Components are concentrated, signal crosstalk occurs easily, and heat accumulation is caused while there is no copper exposed area for heat conduction.
2. There are breakages at a lot of positions of the back plate, and the module deforms easily due to weak intensity.

3. The PCB only has support points in some positions, and extent of moving up and down relative to the module is large. As elements are arranged on two sides, components in some positons easily exceed the upper POL or have excessive thicknesses.
4. The part of the FPC of the light board that is exposed from the back plate is too short, flat insertion cannot be used, and only vertical BTB CNT can be used, which results in an increased thickness, the position where the FPC passes through the back plate needs to be fully opened, which leads to weakened strength, and the module deforms and warps easily.

Reference is made FIGS. 2 to 12. In view of the above issues, the embodiments provide a backlight module for providing a light source for a display panel 10. The display panel 10 includes a bonding side at a side of the display panel 10 in a first direction (referring to an X direction in FIG. 2). The backlight module includes:

a back plate 1, including a base plate 11 at a backlight side of the display panel 10, and a first side plate 12 at the bonding side, where a side of the first side plate 12 away from the base plate 11 is bent towards a direction away from a center of the base plate 11 to form a top plate 13, and the top plate 13 is configured to support the display panel 10;

a rubber frame 3, including a second side plate at the bonding side, where in an extension direction of the second side plate, a first opening is provided in a middle of the second side plate to accommodate the first side plate 12; and a main circuit board 2, where the main circuit board 2 includes opposite first and second ends in the first direction, the first end is inserted between the top plate 13 and the first side plate 12, and the second end is provided with a first bonding area for bonding connection with the display panel 10.

Figure 2:
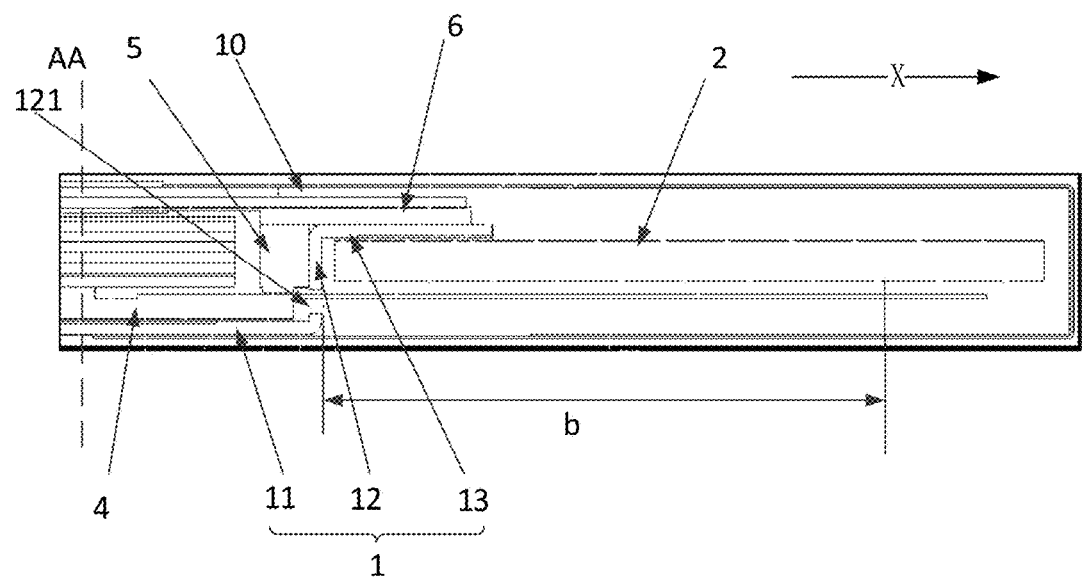
FIG. 2 is a structural diagram of a display device in embodiments of the present disclosure.

FIG. 1 is a schematic view illustrating a display device in the related technologies, and FIG. 2 is a schematic view illustrating a structure of a display device in embodiments of the present disclosure. In FIG. 1, a rubber frame 3 is used to support a display panel 10: in the embodiments, the first opening is provided in the middle of the second side plate of the rubber frame 3: the first side plate 12 and the top plate 13 of the back plate 1 cooperate with each other to support the display panel 10, which take the place of the rubber frame 3; and with the above-mentioned solution, the back plate 1 is inwardly shrunk in the direction of the AA area, and the main circuit board 2 may extend into the space between the first side plate 12 and the top plate 13, increasing the arrangement space for the main circuit board 2. It can be seen by comparing FIGS. 1 and 2 that: in the related technologies, the space occupied by the rubber frame 3 is relatively large, the main circuit board 2 is completely disposed at the periphery of the display panel 10; however, with the backlight module of the embodiments of the present disclosure, the main circuit board 2 extends below the non-display area of the display panel 10, which increases the arrangement space for the main circuit board 2, thereby increasing the wiring space of the main circuit board 2, i.e., increasing the size of the PCB (the main circuit board 2), in this way, distribution of the PCBa components is more reasonable, wiring can better meet the electrical requirements, signal interference is prevented, heat energy from operation of the components is dispersed and conducted, ensuring functions and efficiency of the components.

The backlight module also includes a light guide structure 7, and in the first direction, a distance between the first side plate 12 and the light guide structure 7 is greater than or equal to 0.4 mm. In the first direction, a length L of the space between the top plate 13 and the first side plate 12=a length L1 of a lower frame of the display panel 10−a length L2 of a part of the light guide structure 7 that is disposed outside the AA area−L3.

L3 includes a gap value between the first side plate 12 and the light guide structure 7, and a gap value between the main circuit board 2 and the first side plate 12, and the specific value of L3 may be set according to practical requirements, for example, L3 may range from 0.6 to 0.8 mm, which is not limited thereto.

It needs to be stated that the second end is provided with the first bonding area for bonding connection with the display panel 10, that is, the first bonding area is provided at the far end of the main circuit board 2. When it is combined with the display panel 10, there is still a certain amount of bending arc at the edge near the top plate 13; and a flexible printed circuit board (a second flexible printed circuit board 20) of the display panel 10 may bypass the main circuit board 2 and reach the lower surface of the main circuit board 2 (a surface away from the top plate 13), with reference to FIG. 4, or, the flexible printed circuit board of the display panel 10 may be directly connected to the upper surface (a surface near the top plate 13) of the main circuit board 2, referring to FIG. 3.

As an example, a heat-conducting adhesive 8 is disposed between the top plate 13 and the main circuit board 2.

Heat from the main circuit board 2 is conducted to the back plate 1 through the heat-conducting adhesive 8, and emitted into the air, avoiding heat accumulation, and ensuring functions and efficiency of electronic components.

The main circuit board 2 and the back plate 1 are adhered together by the heat-conducting adhesive 8, which is equivalent to the back plate 1 being provided with reinforcing ribs to increase the strength. In addition, the back plate 1 and the main circuit board 2 are connected as one, and providing multiple lugs to lock or support the main circuit board 2, which introduce multiple stopper holes, is not needed. The main circuit board 2 is fixed reliably, which avoids acoustic sound caused by shaking, effective protection is achieved, strength is relatively enhanced and reliability is improved.

The thickness of the heat-conducting adhesive 8 may be set according to actual needs, for example, in an embodiment, the thickness of the heat-conducting adhesive 8 ranges from 0.5 mm to 1 mm, which is not limited thereto.

As an example, an area of the main circuit board 2 which is used for connection with the top plate 13 is a copper exposed area, and heat from the main circuit board 2 can be quickly conducted to the back plate 1 via the heat-conducting adhesive 8.

As an example, a first surface of the main circuit board 2 close to the top plate 13 includes a wiring area and a non-wiring area, the non-wiring area is connected to the top plate 13, the heat-conducting adhesive 8 is arranged on the non-wiring area, and the non-wiring area is the copper exposed region.

In the embodiments, elements may be arranged on two sides of the main circuit board 2, i.e., elements may be arranged on the first surface and on a second surface opposite to the first surface, but not arranged in the region connected to the top plate 13, i.e., the region connected to the top plate 13 is the non-element-arranging region, so as to rapidly dissipate heat.

As an example, the back plate 1 is made of a conductive metal, and part of the top plate 13 is projected outward to form a lug (reference is made to a first lug 1241 in FIG. 12), and a conductive adhesive is provided between the lug and the main circuit board 2.

The arrangement of the lug increases the connection area of the top plate 13 with the main circuit board 2 and improves the connection stability of the main circuit board 2.

The arrangement of the conductive adhesive enables the back plate 1 and the main circuit board 2 to be grounded together to prevent the generation of static electricity.

It should be noted that the number of the lug may be set according to actual needs, which may be one or more.

It should be noted that the arrangement position of the lug may be set according to actual needs as long as it does not interfere with other components and does not affect the setting of the top plate 13.

In some embodiments, no lugs may be provided. As an example, the back plate 1 is made of a conductive metal, and in a direction parallel to the top plate 13, a region between the top plate 13 and the main circuit board 2 includes a first region 43 provided with a heat-conducting adhesive 8 and a second region provided with a conductive adhesive.

In order to increase the connection stability of the top plate 13 and the main circuit board 2, the first region 43 and the second region are distributed in the extension direction of the top plate 13, where the extension direction of the top plate 13 is perpendicular to the first direction.

It should be noted that, in order to ensure the stability of the connection between the top plate 13 and the main circuit board 2 and to take the convenience of assembly into account, the area of the second region may be set, and the area of the second region may be reduced, for example, the second region occupies 1/10 of the connection region between the main circuit board 2 and the top plate 13, which is not limited thereto.

Figure 7:
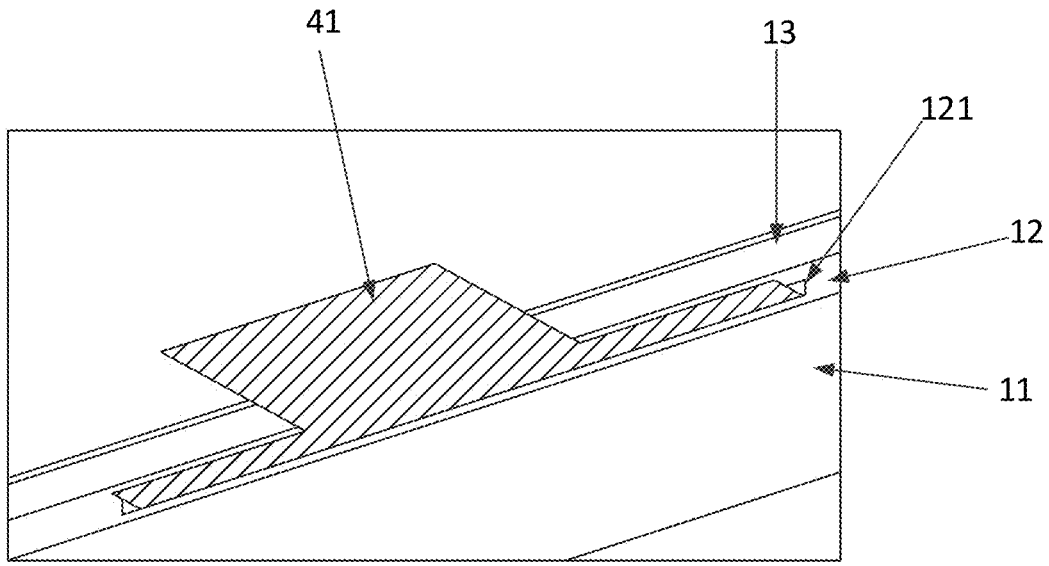
FIG. 7 is a diagram showing a connection state of a flexible printed circuit board of a light bar and a back plate according to embodiments of the present disclosure.

As an example, the backlight module further includes a light bar 4, the light bar 4 includes a light board and a first flexible printed circuit board 41 connected to the light board, and the first flexible printed circuit board 41 passes through a through hole 121 in the first side plate 12 and is disposed on a side of the first side plate 12 away from the base plate 11, with reference to FIG. 7.

In the structure shown in FIG. 1, a size of a part of the first flexible printed circuit board 41 of the light bar 4 that is exposed from the back plate 1 is too short (refer to the length a in FIG. 1), flat insertion cannot be used, and only vertical BTB CNT can be used, which results in an increased thickness: a position of the back plate 1 that corresponds to the first flexible printed circuit board 41 needs to be fully opened, the strength of the back plate 1 is reduced, and the module deforms and warps easily. However, in the embodiments, with reference to FIG. 2, a size of a part of the first flexible printed circuit board 41 that is exposed from the first side plate 12 of the back plate 1 increases (with reference to the length b in FIG. 2), and a distance from the first side plate 12 to the main circuit board 2 CNT increases, which can facilitate inserting the first flexible printed circuit board 41 into the flat CNT or pulling it out of the flat CNT for a person that holds the first flexible printed circuit board 41 with an index finger and a thumb, so as to avoid the problems of increased thickness caused by using a vertical BTB CNT and fully opening of the back plate wall caused due to the BTB CNT being unable to pass through the back plate 1 for its large volume, thereby resulting in a reduced thickness and enhanced strength of the module.

As an example, the light board is connected to multiple first flexible printed circuit boards 41. The first flexible printed circuit boards 41 pass in parallel through a local region, with hole(s), of the first side plate 12 or a region, with hole(s), of the base plate or a connection region, with opening(s), between the first side plate and the base plate, so as to avoid affecting the arrangement of the top plate 13, i.e., the through hole 121 may be arranged in the first side plate 12, or may be arranged in the base plate 11, or may be arranged at the connection position between the first side plate 12 and the base plate 11.

As an example, the first side plate 12 has a plate-like structure perpendicular to the base plate 11.

Figure 3:
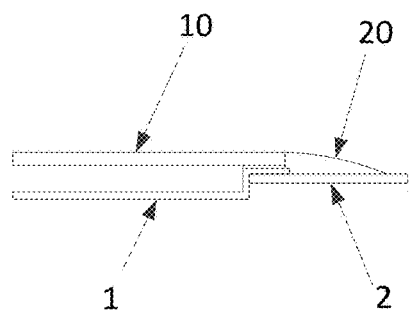
FIG. 3 is a first diagram showing a connection state of a flexible printed circuit board and a main circuit board of a display panel in embodiments of the present disclosure.
Figure 4:
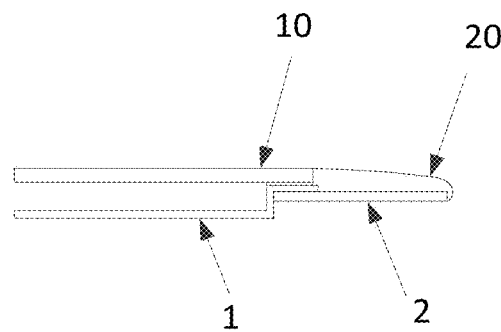
FIG. 4 is a second diagram showing a connection state of a flexible printed circuit board and a main circuit board of a display panel in embodiments of the present disclosure.
Figure 5:
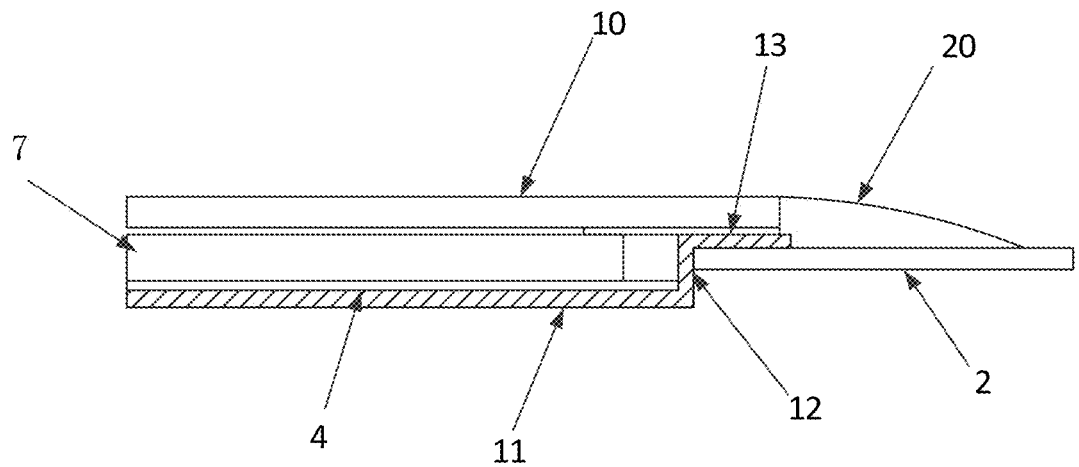
FIG. 5 is a first diagram showing a structure of a back plate in embodiments of the present disclosure.

Referring to FIG. 3, the first side plate 12 has a plate-like structure perpendicular to the base plate 11, and the top plate 13, the first side plate 12, and the base plate 11 form a reversed Z-shaped structure having an improved strength with respect to the L-shaped structure, referring to FIG. 5.

As an example, the first side plate 12 is provided with a reflective tape 5 on the inner side near the base plate 11.

The reflective tape 5 is arranged between the display panel 10 and the light bar 4 for supporting the display panel 10, and the reflective tape 5 reflects the light emitted by the light bar 4, preventing light leakage and improving light efficiency.

The reflective tape 5 may be a yellow-light reflecting tape, which is not limited thereto.

As an example, the reflective tape 5 is a composite tape, where the composite tape includes a support body, and a reflective sub-tape disposed on a side of the support body away from the first side plate 12, or the side of the support body away from the first side plate 12 is coated with a reflective layer.

A side of the support body near the first side plate 12 is provided with a double-sided tape for connection with the first side plate 12 to enhance the connection strength.

The reflective layer is a yellow reflective layer, or the reflective tape 5 is a yellow adhesive tape, which may effectively reflect the side light of the light bar 4 and the blue light of the light mixing board, which alleviates the blue light leakage at the bonding side. The blue light emitted laterally by the light mixing board is reflected, preventing blue light leakage for display image. It should be noted that, since the light board of the mini LED display module obtains white light by light mixture using the blue light chip with a QD film (red-green quantum dot film) or a fluorescent powder film, the blue light of the chip may leak out from the assembly gap at the film edge, and the yellow reflective layer may reflect the blue light laterally leaking from the light mixing board.

As an example, the reflective tape 5 includes a base made of a PC, PET or PU material, and a double-sided tape or a single-sided tape attached to opposite sides of the base.

As an example, the base is made of SB00 or KE951, or foam having a certain compression ratio in advance, which is not limited thereto.

As an example, the display device further includes a light bar 4, the light bar 4 includes a light board and a first flexible printed circuit board 41 connected to the light board, the light board includes an LED light setting area 42 and a first region 43 disposed at a side of the LED light setting area 42 in the first direction, the first region 43 is provided with a second bonding area for bonding connection with the first flexible printed circuit board 41, and the reflective tape 5 is disposed between the first region 43 and the display panel 10.

Figure 10:
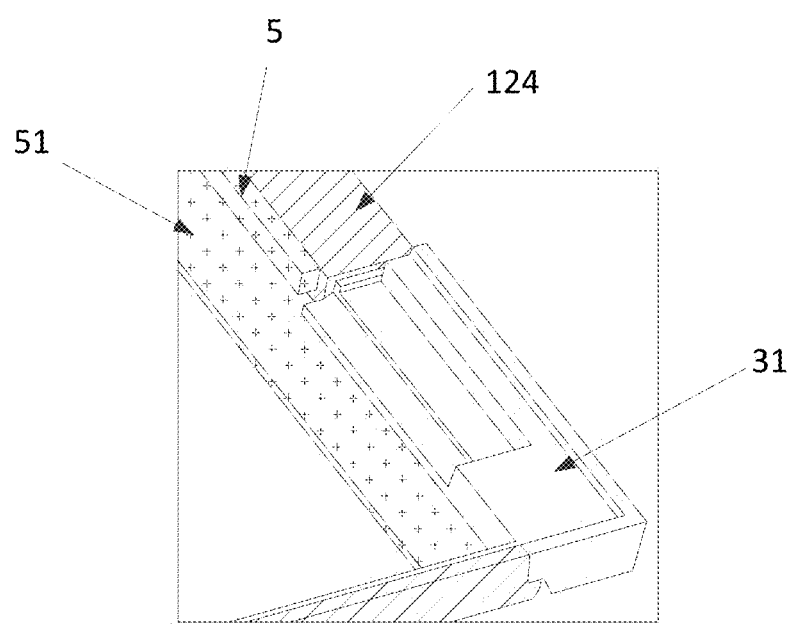
FIG. 10 is a diagram showing arrangement position of a reflective tape in embodiments of the present disclosure.

In the related technologies, a protective adhesive layer is provided on the LED light setting area 42, a bonding adhesive layer 51 for eliminating step difference is provided on the first region 43; and in the embodiments, the bottom of the reflective tape 5 and the bonding adhesive layer 51 for eliminating step difference provided on the first region 43 are combined into one, and are pressed against the light board, and bear the display panel 10 together with the top plate 13, with reference to FIG. 10.

It should be noted that, when the backlight module is assembled with the display panel 10, a fixing adhesive 6 is arranged between the display panel 10 and the top plate 13; in some embodiments, a side of the reflective tape 5 away from the base plate 11 may be arranged as an integral structure with the fixing adhesive 6, i.e., the reflective tape 5 is in an L-shaped or T-shaped structure (in embodiments where the reflective tape 5 is in a T-shaped structure, part of the reflective tape 5 extends above the light guide structure 7).

As an example, a groove is concavely formed at a position, corresponding to the second bonding area, on the connection surface where the reflective tape 5 is connected to the first region 43.

The groove is provided to avoid the second bonding area, so as to avoid a situation that the second bonding area is pressed and affects the connection between the light board and the first flexible printed circuit board 41, and also to avoid a situation that the second bonding area and the reflective tape interfere with and overlap with each other and push the display panel, which results in uneven loading on the display panel and then results in uneven pictures.

As an example, the first side plate 12 includes a first portion 122, a second portion 123, and a third portion 124.

The first portion 122 is connected to the base plate 11 and is perpendicular to the base plate 11.

The second portion 123 is formed by bending the first portion 122 in a direction of approaching a center of the base plate 11, and the second portion 123 is parallel to the base plate 11.

The third portion 124 is formed by bending the second portion 123 in a direction away from the base plate 11, and the third portion 124 is parallel to the first portion 122, i.e., the third portion 124 is perpendicular to the second portion 123.

Figure 6:
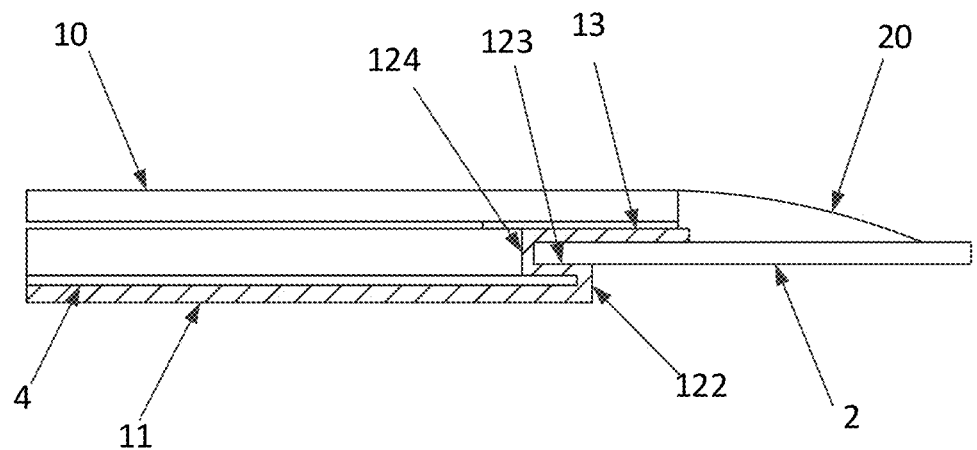
FIG. 6 is a second diagram showing a structure of a back plate in embodiments of the present disclosure.

The first end of the main circuit board 2 is inserted into a space formed by the top plate 13, the second portion 123 and the third portion 124 together, with reference to FIG. 6.

With the above-mentioned solution, the top plate 13, the first side plate 12 and the base plate 11 form a double U-shaped structure; compared with the embodiments where the first side plate 12 is a plate-shaped structure, there is no need to provide the reflective tape 5, the third portion 124 continues to be retracted inwards in the direction close to the AA area, and the first end of the main circuit board 2 is inserted into the space formed by the top plate 13, the second portion 123 and the third portion 124, thereby further expanding the space for arranging the main circuit board 2.

As an example, a reflective layer is provide on respective side surfaces, near the base plate 11, of the first portion 122, the second portion 123 and the third portion 124.

The reflective layer may be a yellow paint which reflects blue light emitted laterally by the light mixing board to prevent the display from leaking blue light.

As an example, the backlight module further includes a light bar 4, the light bar 4 includes a light board and a first flexible printed circuit board 41 connected to the light board, the light board includes an LED light setting area 42 and a first region 43 disposed at a side of the LED light setting area 42 in the first direction, the first region 43 is provided with a second bonding area for bonding connection with the first flexible printed circuit board 41, and the first portion 122 is connected to the first region 43.

When it is assembled with the display panel 10, the first side plate 12 and the top plate 13 are cooperatively disposed between the light board and the display panel 10 to support the display panel 10.

As an example, a connection surface where the first portion 122 is connected to the first region 43 is provided with a groove at a position corresponding to the second bonding area in a concave manner.

The groove is provided to avoid the first bonding area and prevent the connection between the light board and the first flexible printed circuit board 41 from being affected by pressure; and also avoid a situation that the second bonding area and the reflective tape interfere with and overlap with each other and push the display panel, which results in uneven loading on the display panel and then results in uneven pictures.

Figure 8:
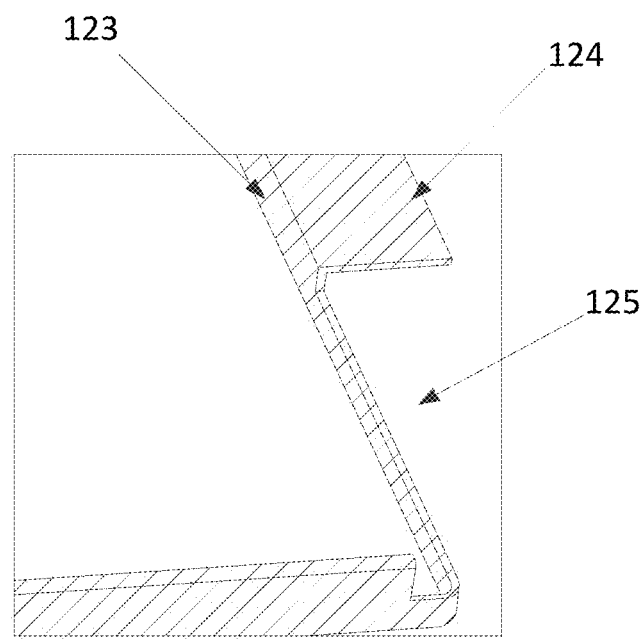
FIG. 8 is a partial structural diagram of a back plate in embodiments of the present disclosure.

As an example, second openings 125 are provided in both ends of the first side plate 12 in the extension direction of the first side plate 12, referring to FIG. 8.

The backlight module further includes a rubber frame 3, the rubber frame 3 includes a second side plate disposed at the bonding side, a first opening is provided in the middle of the second side plate in the direction of extension of the second side plate so as to accommodate the first side plate 12, and two connection parts 31, of the second side plate, disposed at two ends of the first opening respectively cooperate with the corresponding second openings 125.

Figure 9:
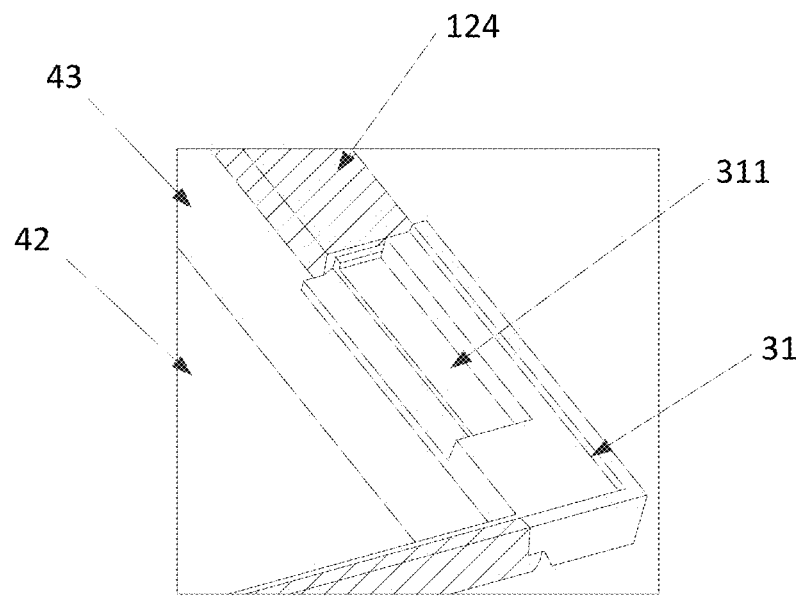
FIG. 9 is a diagram showing a connection state of a back plate and a rubber frame in embodiments of the present disclosure.

When the rubber frame 3 is assembled with the back plate 1, they are connected through snap-fit from top to bottom, namely, the two connection parts 31 are correspondingly snap-fitted into the second openings 125, and the first side plate 12 is correspondingly snap-fitted into the first openings so as to facilitate assembly, and FIG. 9 is a schematic diagram of a state after the back plate 1 is assembled with the rubber frame.

An adhesive tape may be additionally provided between the rubber frame 3 and the back plate 1 to improve the connection strength.

Figure 11:
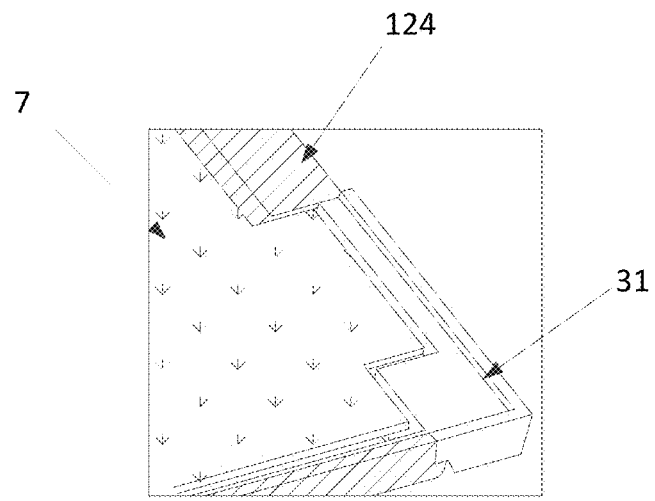
FIG. 11 is a diagram showing a connection state of a light guide structure and a rubber frame in embodiments of the present disclosure.
Figure 12:
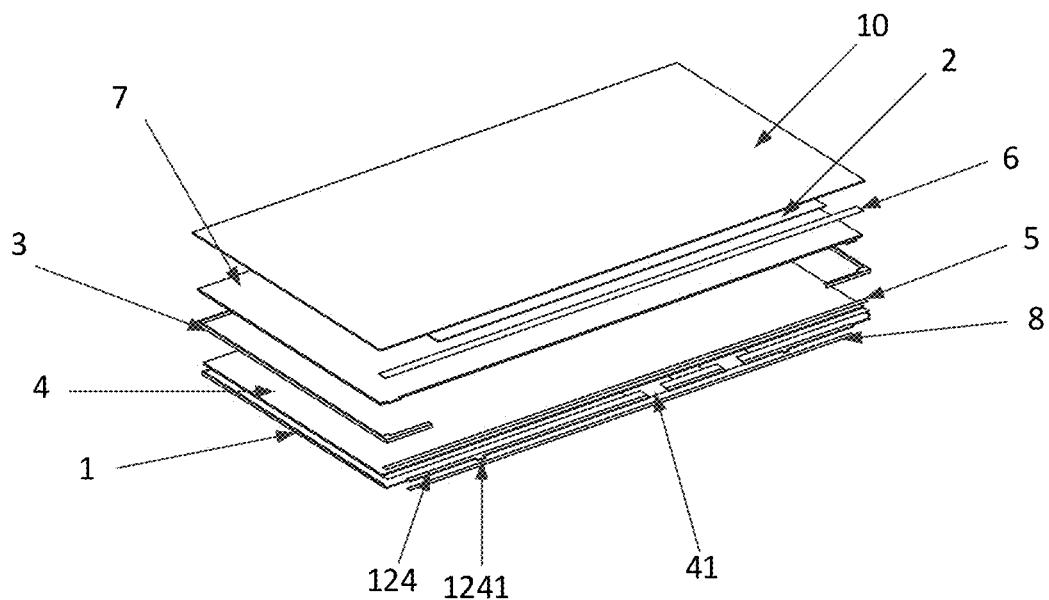
FIG. 12 is an exploded diagram of a display device in embodiments of the present disclosure.

As an example, the backlight module further includes a light guide structure 7, a groove (referring to a first groove 311 in FIG. 9) is provided on a surface of the connection part 31 away from the base plate 11 so as to cooperate with a lug on the light guide structure 7, and FIG. 11 is a schematic diagram of an assembled state of the light guide structure 7 and the rubber frame 3.

The light guide structure 7 includes a light guide plate and an optical film arranged on the light-emitting side of the light guide plate, and the optical film is provided with the lug so as to be connected in the groove in the connection part 31.

Figure 13:
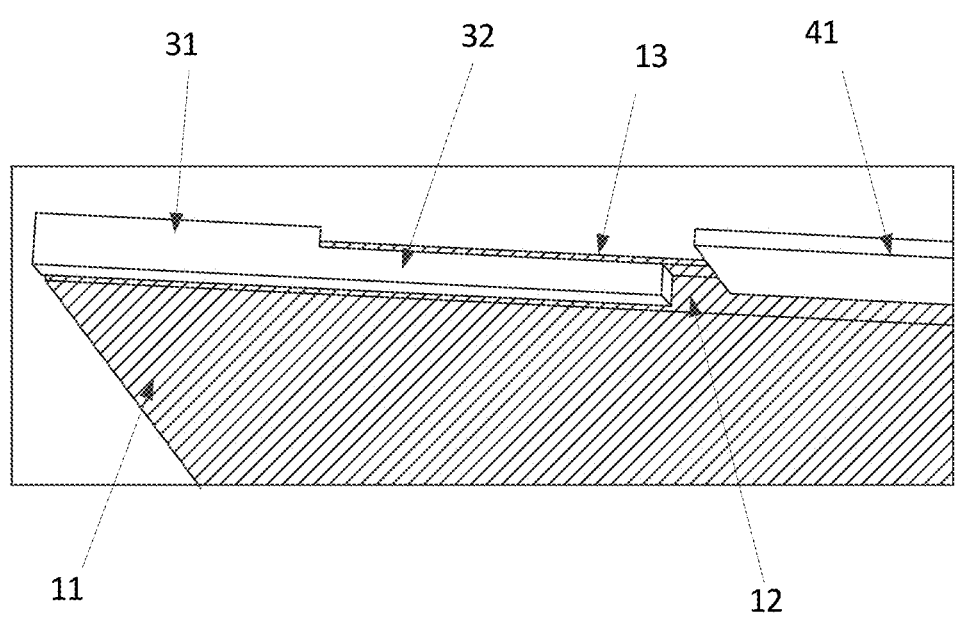
FIG. 13 is a diagram showing connection of a back plate and a rubber frame in embodiments of the present disclosure.

Reference is made to FIG. 13. As an example, one of the connection parts 31 includes an extension part 32 extending toward the other of the connection parts 31, and the extension part 32 is connected to a surface of the first side plate 12 away from the base plate 11 through an adhesive layer.

The extension part 32 is provided so that the rubber frame 3 and the back 1 are connected to form a closed structure, enhancing the connection strength between the rubber frame and the back plate.

As an example, a gap between the main circuit board 2 and the first side plate 12 ranges from 0 to 0.15 mm to avoid interference.

Embodiments of the present disclosure also provide a display device, including a display panel 10 and the above-mentioned backlight module, the display panel 10 includes a first edge disposed at the bonding side, the top plate 13 includes a second edge disposed away from the base plate 11, the first edge is disposed at a side of the second edge near the base plate 11, and a distance between the edge of the display panel 10 at the bonding side and the edge of the top plate 13 away from the display panel 10 is greater than 0.15 mm.

As an example, a heat-conducting adhesive 8 is arranged between the top plate 13 and the main circuit board 2, and a fixing adhesive 6 is arranged between the display panel 10 and the top plate 13.

The display panel 10 includes a first polarizer, a first substrate, a second substrate and a second polarizer which are sequentially stacked in a direction away from the backlight module: a height of each component on the main circuit board 2 is less than or equal to a first height, and the first height is a sum of the thickness of the heat-conducting adhesive 8, the thickness of the top plate 13, the thickness of the fixing adhesive 6, the thickness of the first substrate and the thickness of the second substrate.

In the embodiments, components may be arranged on both sides of the main circuit board 2, the component on a first surface close to the display panel 10 cannot be above the second polarizer, namely, a distance between a surface, of the component on the first surface, away from the base plate 11 and the base plate 11 is less than a distance between the second polarizer and the base plate 11: the positions of the main circuit board 2 and the back plate 1 are relatively fixed, and a fixing adhesive 6 with a relatively large thickness is provided in the gap between the back plate 1 and the display panel 10, which adjusts the spacing between the back plate 1 and the display panel 10, and relieves the stress between the display panel 10 and the back plate 1.

The display device may be any product or component with a display function, such as a liquid crystal television, a liquid crystal display, a digital photo frame, a mobile phone, or a tablet computer, and the display device further includes the flexible printed circuit board, a printed circuit board and the back plate 1.

It can be understood that the above embodiments are exemplary embodiments for explaining principles of the present disclosure, and the present disclosure is not limited thereto. For those skilled in the art, without departing from the spirit and essence of the present disclosure, various modifications and improvements may be made. These modifications and improvements shall fall within the protection scope of the present disclosure.

What is claimed is:

1. A backlight module for providing a light source for a display panel, wherein the display panel has a bonding side at a side of the display panel in a first direction, and the backlight module comprises:
    a back plate, wherein the back plate comprises a base plate at a backlight side of the display panel, and a first side plate at the bonding side, wherein a side of the first side plate away from the base plate is bent towards a direction away from a center of the base plate to form a top plate, and the top plate is configured to support the display panel;
    a rubber frame, comprising a second side plate at the bonding side, wherein a first opening is provided in a middle of the second side plate in an extension direction of the second side plate so as to accommodate the first side plate; and
    a main circuit board, wherein the main circuit board comprises a first end and a second end in the first direction that are opposite to each other, the first end is inserted between the top plate and the first side plate, and the second end has a first bonding area for bonding connection with the display panel.

2. The backlight module according to claim 1, wherein a heat-conducting adhesive is provided between the top plate and the main circuit board.

3. The backlight module according to claim 2, wherein a first surface of the main circuit board near the top plate has a wiring area and a non-wiring area, and the non-wiring area is a copper exposed area and is connected to the top plate through the heat-conducting adhesive.

4. The backlight module according to claim 1, wherein the back plate is made of a conductive metal, part of the top plate projects outwardly to form a lug, and a conductive adhesive is provided between the lug and the main circuit board.

5. The backlight module according to claim 1, wherein the back plate is made of a conductive metal, and a region between the top plate and the main circuit board comprises a first region and a second region in a direction parallel to the top plate, wherein the first region is provided with a heat-conducting adhesive, and the second region is provided with a conductive adhesive.

6. The backlight module according to claim 1, further comprising a light bar, wherein the light bar comprises a light board and a first flexible printed circuit board connected to the light board, and the first flexible printed circuit board passes through a through hole in the first side plate and extends to a side of the first side plate away from the base plate.

7. The backlight module according to claim 1, wherein the first side plate has a plate-like structure perpendicular to the base plate.

8. The backlight module according to claim 7, wherein the first side plate is provided with a reflective tape on its inner side surface near the base plate.

9. The backlight module according to claim 8, wherein the reflective tape comprises a base made of PC, PET or PU material, and a double-sided tape or a single-sided tape attached to opposite sides of the base.

10. The backlight module according to claim 8, further comprising a light bar, wherein the light bar comprises a light board and a first flexible printed circuit board connected to the light board, the light board comprises an LED light setting area and a first region at a side of the LED light setting area in the first direction, the first region has a second bonding area for bonding connection with the first flexible printed circuit board, and the reflective tape is between the first region and a non-display area of the display panel.

11. The backlight module according to claim 10, wherein a position, corresponding to the second bonding area, on a connection surface where the reflective tape is connected to the first region is recessed to form a groove.

12. The backlight module according to claim 1, wherein the first side plate comprises a first portion, a second portion, and a third portion;
    the first portion is connected to the base plate and perpendicular to the base plate;
    the second portion is formed by bending the first portion in a direction of approaching a center of the base plate, and the second portion is parallel to the base plate;
    the third portion is formed by bending the second portion in a direction away from the base plate, and the third portion is perpendicular to the second portion; and
    the first end of the main circuit board is inserted into a space formed by the top plate, the second portion and the third portion together.

13. The backlight module according to claim 12, wherein a reflective layer is provide on respective side surfaces, near the base plate, of the first portion, the second portion and the third portion.

14. The backlight module according to claim 12, further comprising a light bar, wherein the light bar comprises a light board and a first flexible printed circuit board connected to the light board, the light board comprises a LED light setting area and a first region at a side of the LED light setting area in the first direction, the first region has a second bonding area for bonding connection with the first flexible printed circuit board, and the first portion is connected to the first region.

15. The backlight module according to claim 14, wherein a position, corresponding to the second bonding area, on a connection surface where the first portion is connected to the first region is recessed to form a groove.

16. The backlight module according to claim 1, wherein second openings are provided in two ends of the first side plate in an extension direction of the first side plate;
the second side plate comprises two connection parts at two ends of the first opening, and the two connection parts respectively cooperate with the corresponding second openings.

17. The backlight module according to claim 16, further comprising a light guide structure, wherein a groove is provided on a surface of the connection part away from the base plate to cooperate with a lug on the light guide structure.

18. The backlight module according to claim 16, wherein one of the connection parts comprises an extension part extending towards the other of the connection parts, and the extension part is connected to a surface of the first side plate away from the base plate through an adhesive layer.

19. A display device, comprising: a display panel and the backlight module according to claim 1, wherein the display panel comprises a first edge at the bonding side, the top plate comprises a second edge away from the base plate, the first edge is at a side of the second edge near the base plate, and a distance between the edge of the display panel at the bonding side and the edge of the top plate away from the display panel is greater than 0.15 mm.

20. The display device according to claim 19, wherein a heat-conducting adhesive is provided between the top plate and the main circuit board, and a fixing adhesive is provided between the display panel and the top plate;
the display panel comprises a first polarizer, a first substrate, a second substrate and a second polarizer that are sequentially stacked in a direction away from the backlight module; a height of each component on the main circuit board is less than or equal to a first height, and the first height is a sum of a thickness of the heat-conducting adhesive, a thickness of the top plate, a thickness of the fixing adhesive, a thickness of the first substrate, and a thickness of the second substrate.

* * * * *